US007635739B2

(12) United States Patent
Allen et al.

(10) Patent No.: US 7,635,739 B2
(45) Date of Patent: *Dec. 22, 2009

(54) SUBSTANTIALLY LINEAR POLYMERS AND METHODS OF MAKING AND USING SAME

(75) Inventors: Nathan Tait Allen, Norristown, PA (US); Brian Leslie Goodall, Ambler, PA (US); Lester Howard McIntosh, III, Green Lane, PA (US)

(73) Assignee: Rohm and Haas Company, Philadelphia, PA (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/457,982

(22) Filed: Jul. 17, 2006

(65) Prior Publication Data

US 2007/0049712 A1 Mar. 1, 2007

Related U.S. Application Data

(60) Provisional application No. 60/712,866, filed on Aug. 31, 2005.

(51) Int. Cl.
*C08F 4/80* (2006.01)
*C08F 118/08* (2006.01)
*C08F 220/44* (2006.01)
*C08F 220/56* (2006.01)
*C08F 220/10* (2006.01)
*C08F 212/06* (2006.01)
*B01J 31/18* (2006.01)

(52) U.S. Cl. ............... 526/172; 526/319; 526/329; 526/347; 502/162; 502/168; 502/217

(58) Field of Classification Search .......... 526/172
See application file for complete search history.

(56) References Cited

U.S. PATENT DOCUMENTS

| 4,689,437 | A | 8/1987 | Murray |
| 4,698,403 | A | 10/1987 | Klabunde |
| 6,060,569 | A | 5/2000 | Bennett et al. |
| 6,310,163 | B1 * | 10/2001 | Brookhart et al. ........ 526/318.6 |
| 6,417,303 | B1 | 7/2002 | Stibrany et al. |
| 7,524,912 | B2 * | 4/2009 | Goodall et al. ............. 526/348 |
| 2002/0037982 | A1 | 3/2002 | Johnson et al. |

FOREIGN PATENT DOCUMENTS

| EP | 0 280 380 A2 | 8/1988 |
| EP | 0 589 527 A1 | 3/1994 |
| EP | 0 589 527 | 7/1999 |
| EP | 1 508 577 A | 2/2005 |
| JP | 2003268028 A * | 9/2003 |
| WO | WO 00/06615 A | 2/2000 |
| WO | WO 0006615 | 2/2000 |

OTHER PUBLICATIONS

JP 2003-268028A English Machine Translation.*
Hearley, et al., New Single-Site Palladium Catalysts for the Nonalternative Copolymerization of Ethylene and Carbon Monoxide, Organometallics, vol. 24, pp. 2755-2763 (2005).
Drent, et al., Palladium catalysed copolymerization of ethene with alkylacrylates: polar commonomer built into the linear polymer chain, Chem. Commun. pp. 744-745 (2002).
Schultz, et al., Palladium(II) Complexes with Chelating P,O-Ligands as Catalysts for the Heck Reaction, Synthesis No. 6, pp. 1005-1011 (2005).
Katho, et al., Formation and Solid State Structures of Highly Crystalline Guanidinium Salts of Sulfonated Tertiary Phosphanes, Adv. Synth. Catal. No. 3/4, pp. 278-282 (2002).
Genet, et al., Recent developments of palladium(0) catalyzed reactions in aqueous medium, J. Organometallic Chemistry, vol. 576, Issues 1 2, pp. 305-317 (1999).
Meking et al: Mechanistic Studies of the Palladium-Catalyzed . . . , Journal of the American Chemical Society, American Chemical Society, vol. 120, Jan. 27, 1998, pp. 888-889.
Popeney C et al: "Ligand Electronic Effects On Late Transition Metal Polymerization Catalysts", Organometallics, ACS, vol. 24, No. 6, Mar. 14, 2005, pp. 1145-1155.

* cited by examiner

*Primary Examiner*—Randy Gulakowski
*Assistant Examiner*—Brieann R Fink
(74) *Attorney, Agent, or Firm*—Thomas S. Delbert

(57) ABSTRACT

Copolymers and terpolymers containing acyclic aliphatic olefin derived units and polar monomer derived units are disclosed. Also disclosed are methods of making such copolymers and terpolymers using late transition metal catalyst complexes.

8 Claims, No Drawings

SUBSTANTIALLY LINEAR POLYMERS AND METHODS OF MAKING AND USING SAME

This Application claims the benefit of U.S. Provisional Patent Application No. 60/712,866, filed on Aug. 31, 2005.

This invention was made with United States Government support under ATP Award No. 70NANB4H3014 awarded by the National Institute of Standards and Technology (NIST). The United States Government has certain rights in the invention.

The present invention relates to copolymers and terpolymers containing, inter alia, acyclic aliphatic olefins and polar monomers. The invention also relates to processing for making such copolymers and terpolymers.

Commercial processes for the copolymerization of ethylene with polar monomers such as acrylates, methacrylates, and vinyl acetate employ free radical processes in which the incorporation of the polar functionality is relatively random. The use of free radical initiators across the entire acrylic polymer market gives little or no control over polymer architecture (tacticity or crystallinity, blockiness, molecular weight, and molecular weight distribution) and thus limits the accessible range of materials performance properties. Because these free radical processes require extreme pressures, they are associated with high capital investment and manufacturing costs, and, of course, increased safety hazards.

There is a need for new molecular catalysts capable of copolymerizing acyclic aliphatic olefins with polar monomers under mild reaction conditions and in a stereoregular ("tactic") fashion. Of the many approaches to modifying the properties of a polymer that are available, the incorporation of functional groups into an otherwise non-polar material is of paramount importance. Polar groups exercise control over important polymer properties such as toughness, adhesion, barrier properties, and surface properties. These polymer properties manifest themselves in the properties of materials incorporating the polymer, such as solvent resistance, miscibility with other polymers, and rheological properties, leading to product performance such as paintability, printability, gloss, hardness, and mar resistance. By incorporating polar groups into hydrocarbon polymers such as polyethylene, polypropylene and polystyrene, not only would the important properties related to crystallinity (modulus, strength, solvent resistance, etc.) be maintained, but new properties would also be expressed.

One method of making the copolymers is disclosed in U.S. Pat. No. 6,417,303 to Stibrany et al. Stibrany et al. disclose copolymers formed using a metal complex having the formula $LMX_1X_2$; wherein L is a bidentate nitrogen-containing ligand with more than 2 nitrogens; M is copper, silver or gold; $X_1$ and $X_2$ are independently selected from the group consisting of halogens, hydride, triflate, acetate, trifluoroacetate, perfluorotetraphenylborate, tetrafluoroborate, $C_1$-$C_{12}$ alkyl, $C_1$-$C_{12}$ alkoxy, $C_3$-$C_{12}$ cycloalkyl, $C_3$-$C_{12}$ cycloalkoxy, aryl, and any other moiety into which a monomer can insert. Stibrany et al. further disclose that the copolymers may have segments formed from olefinic monomers and monomers having at least one hydrocarbyl polar functional group. The copolymers produced by Stibrany et al., however, were of low number average molecular weight (i.e., $\leq 26,200$)

Another method of making copolymers is disclosed in European Patent Number EP 0 589 527 to Drent et al. Drent et al. disclose a group of palladium catalyst complexes comprising a palladium metal center complexed with an anion derived from an acid having a $pK_a$ of less than 3, and containing an atom of Group VA of the Periodic Table of Elements, wherein the Group VA atom is substituted with at least one aryl group, said aryl group being substituted with a polar group on the ortho position. Drent et al. further disclose copolymers of ethylene with acrylates or vinyl acetate prepared using the palladium catalyst complexes disclosed in European Patent Number EP 0 589 527. The copolymers produced by Drent et al., however, were of low number average molecular weight (i.e., $\leq 21,100$). (See Drent, et al., *Palladium catalysed copolymerization of ethene with alkylacrylates: polar comonomer built into the linear polymer chain*, CHEM. COMMUN., pp. 744-745 (2002)).

As the polymer chains grow longer, the strength of the polymer increases to a point. That is, after polymer chains have reached a certain length referred to as the "entanglement molecular weight", additional chain lengthening has little effect on the strength of the polymer. This can be understood by imagining entangled chains. As the chains grow, their entanglement increases. At a certain length, they are so strongly entangled that any additional entanglement will not add significant strength to the system because the failure will occur within the chain rather than through chain slippage. Below the entanglement molecular weight the polymers may exhibit low strength due to a lack of sufficient chain entanglement.

Accordingly, there remains a need for substantially linear copolymers derived from acyclic aliphatic olefins and polar monomers and for methods of making the same. There also remains a need for methods of making substantially linear copolymers derived from acyclic aliphatic olefins and polar monomers, wherein the copolymers exhibit a high molecular weight and have high strength properties.

In one aspect of the present invention, there is provided a process for preparing a copolymer comprising contacting at least one acyclic aliphatic olefin monomer, at least one monomer having the formula

and a catalyst composition comprising a metal center, M, complexed with at least one ligand, wherein the at least one ligand has a structure according to the following formula

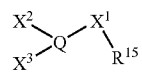

wherein Z is selected from a halogen, —CN, an aromatic hydrocarbyl group, —COY and —$CO_2Y$; where Y is selected from hydrogen and $R^{19}$; where $R^{19}$ is selected from a hydrocarbyl group, an aromatic hydrocarbyl group and derivatives thereof, wherein J is selected from a hydrogen and an aliphatic hydrocarbyl group having up to 30 carbons; wherein M is selected from Ni and Pd; wherein $X^1$, $X^2$ and $X^3$ are independently selected from a hydrocarbyl group, an aromatic hydrocarbyl group and derivatives thereof, wherein Q is selected from phosphorus, arsenic, nitrogen and antimony; wherein $R^{15}$ is selected from —$SO_3$, —$SO_2N(R^{18})$, —$CO_2$, —$PO_3$, —$AsO_3$, —$SiO_2$, —$C(CF_3)_2O$; wherein $R^{18}$ is selected from a hydrogen, a halogen, a hydrocarbyl group, an aromatic hydrocarbyl group and a substituted hydrocarbyl group; wherein the copolymer has a number average molecular weight of $\geq 21,200$ and wherein the copolymer comprises 1 to 99.9 mol % acyclic aliphatic olefin monomer units.

In another aspect of the invention, there is provided a process for preparing a terpolymer comprising contacting at least one acyclic aliphatic olefin monomer, at least one norbornene or substituted norbornene monomer, at least one monomer having the formula

and a catalyst composition comprising a metal center, M, complexed with at least one ligand, wherein the at least one ligand has a structure according to the following formula

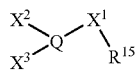

wherein Z is selected from a halogen, —CN, an aromatic hydrocarbyl group, —COY and —$CO_2Y$; where Y is selected from hydrogen and $R^{19}$; where $R^{19}$ is selected from a hydrocarbyl group, an aromatic hydrocarbyl group and derivatives thereof, wherein J is selected from a hydrogen and an aliphatic hydrocarbyl group having up to 30 carbons; wherein M is selected from Ni and Pd; wherein $X^1$, $X^2$ and $X^3$ are independently selected from a hydrocarbyl group, an aromatic hydrocarbyl group and derivatives thereof, wherein Q is selected from phosphorus, arsenic, nitrogen and antimony; wherein $R^{15}$ is selected from —$SO_3$, —$SO_2N(R^{18})$, —$CO_2$, —$PO_3$, —$AsO_3$, —$SiO_2$, —$C(CF_3)_2O$; wherein $R^{18}$ is selected from a hydrogen, a halogen, a hydrocarbyl group, an aromatic hydrocarbyl group and a substituted hydrocarbyl group; and, wherein the terpolymer comprises 0.1 to 50 mol % norbornene or substituted norbornene derived units.

In another aspect of the present invention, there is provided a copolymer derived from a palladium catalyzed polymerization, wherein the copolymer has a polymer chain comprising the formula:

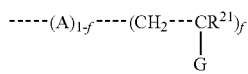

wherein A is derived from an acyclic aliphatic olefin monomer; $R^{21}$ is selected from H and $CH_3$; G is selected from —$OR^{22}$ and —$COOR^{22}$, where $R^{22}$ is a $C_{1-24}$ alkyl group; and wherein the copolymer has a number average molecular weight of $\geqq 26,500$ and f is 0.001 to 0.99.

In another aspect of the present invention, there is provided a terpolymer derived from a late transition metal catalyzed polymerization, wherein the terpolymer has a polymer chain comprising the formula:

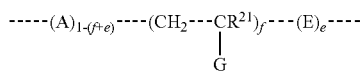

wherein A is derived from an acyclic aliphatic olefin monomer; $R^{21}$ is selected from H and $CH_3$; G is selected from —$OR^{22}$ and —$COOR^{22}$, where $R^{22}$ is a $C_{1-24}$ alkyl group; E is derived from a norbornene, a substituted norbornene, a styrene or a derivative of styrene; f is 0.001 to 0.99 and c is 0.001 to 0.5.

The term "copolymer" as used herein and in the appended claims refers to polymers prepared from at least two different monomers.

The term "terpolymer" as used herein and in the appended claims refers to polymers prepared from at least three different monomers.

In some embodiments of the present invention, Z is selected from a halogen, —CN, an aromatic hydrocarbyl group, —COY and —$CO_2Y$; wherein Y is selected from hydrogen and $R^{19}$; where $R^{19}$ is selected from a hydrocarbyl group, an aromatic hydrocarbyl group and derivatives thereof. In some aspects of these embodiments, $R^{19}$ is selected from aliphatic hydrocarbyl groups having up to 30 carbon atoms and aromatic hydrocarbyl groups having up to 30 carbon atoms. In some aspects of these embodiments, $R^{19}$ is selected from an alkyl group, a cycloalkyl group, an alkenyl group, an alkynyl group, an aryl group, an arylalkyl group, an alkylaryl group, a phenyl group, a biphenyl group, a carboxylate group, an alkoxy group, an alkenyloxy group, an alkynyloxy group, an aryloxy group, an alkoxycarbonyl group, an alkylthio group, an alkylsulfonyl group, an alkylsulfinyl group, a silyl group, and derivatives thereof. In some aspects of these embodiments, $R^{19}$ is selected from a $C_1$-$C_{20}$ alkyl group, a $C_3$-$C_{20}$ cycloalkyl group, a $C_2$-$C_{20}$ alkenyl group, a $C_2$-$C_{20}$ alkynyl group, an aryl group, an arylalkyl group, an alkylaryl group, a phenyl group, a biphenyl group, a $C_1$-$C_{20}$ carboxylate group, a $C_1$-$C_{20}$ alkoxy group, a $C_2$-$C_{20}$ alkenyloxy group, a $C_2$-$C_{20}$ alkynyloxy group, an aryloxy group, a $C_2$-$C_{20}$ alkoxycarbonyl group, a $C_1$-$C_{20}$ alkylthio group, a $C_1$-$C_{20}$ alkylsulfonyl group, a $C_1$-$C_{20}$ alkylsulfinyl group, a silyl group, and derivatives thereof In some embodiments of the present invention, J is selected from a hydrogen and an aliphatic hydrocarbyl group having up to 30 carbons. In some aspects of these embodiments, J is selected from a hydrogen and a $C_1$-$C_8$ aliphatic hydrocarbyl group.

In some embodiments of the present invention, M is selected from Ni and Pd. In some aspects of these embodiments, M is Ni. In some aspects of these embodiments, M is Pd.

In some embodiments of the present invention, Q is selected from phosphorus, arsenic and antimony. In some aspects of these embodiments, Q is selected from phosphorus and arsenic. In some aspects of these embodiments, Q is phosphorus.

In some embodiments of the present invention, $R^{15}$ is selected from —$SO_3$, —$SO_2N(R^{18})$, —$CO_2$, —$PO_3$, —$AsO_3$, —$SiO_2$, —$C(CF_3)_2O$. In some aspects of these alternatively $R^{15}$ is selected from —$SO_3$ and —$SO_2N(R^{18})$. In some aspects of these embodiments, $R^{15}$ is —$SO_3$. In some aspects of these embodiments, $R^{18}$ is selected from a hydrogen, a halogen, a hydrocarbyl group and a substituted hydrocarbyl group. In some aspects of these embodiments, $R^{18}$ is selected from a hydrogen; a halogen; and, a substituted or unsubstituted substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, and silyl. In some aspects of these embodiments, $R^{18}$ is selected from a methyl group and a halogenated methyl group In some embodiments of the present invention, $X^1$, $X^2$ and $X^3$ are all different.

In some embodiments of the present invention, $X^2$ and $X^3$ are the same.

In some embodiments of the present invention, $X^1$, $X^2$ and $X^3$ are independently selected from aliphatic hydrocarbyl groups and aromatic hydrocarbyl groups. In some aspects of these embodiments, $X^1$, $X^2$ and $X^3$ are independently selected from aliphatic hydrocarbyl groups and aromatic hydrocarbyl groups having up to 30 carbon atoms. In some aspects of these embodiments, $X^1$, $X^2$ and $X^3$ are independently selected from alkyl, cycloalkyl, alkenyl, alkynyl, aryl, arylalkyl, alkylaryl, phenyl, biphenyl, carboxylate, alkoxy, alkenyloxy, alkynyloxy, aryloxy, alkoxycarbonyl, alkylthio, alkylsulfonyl, alkylsulfinyl, silyl, and derivatives thereof. In some aspects of these embodiments, $X^1$, $X^2$ and $X^3$ are independently selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl, and derivatives thereof.

In some embodiments of the present invention, $X^2$ and $X^3$ are independently selected from aryl groups with an ortho substituted phenyl. In some aspects of these embodiments, $X^2$ and $X^3$ are independently selected from aryl groups with an ortho substituted, substituted phenyl. In some aspects of these embodiments, $X^2$ and $X^3$ are independently selected from aryl groups with an ortho substituted, substituted phenyl having a formula 2,6-$R^{16}R^{17}$-phenyl; where $R^{16}$ and $R^{17}$ are independently selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof. In some aspects of these embodiments, $X^2$ and $X^3$ are aryl groups with an ortho substituted 2,6-dimethoxy phenyl.

In some embodiments of the present invention, the at least one ligand having the structure

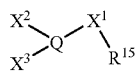

is according to the formula:

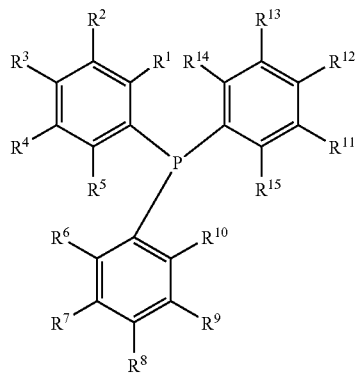

wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof; wherein $R^{15}$ is selected from —$SO_3$, —$SO_2N(R^{18})$, —$CO_2$, —$PO_3$, —$AsO_3$, —$SiO_2$, —$C(CF_3)_2O$; alternatively wherein $R^{15}$ is selected from —$SO_3$ and —$SO_2N(R^{18})$; alternatively wherein $R^{15}$ is —$SO_3$; alternatively wherein $R^{15}$ is —$SO_2N(R^{18})$; wherein $R^{18}$ is selected from a hydrogen; a halogen; and, a substituted or unsubstituted substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof.

In some embodiments of the present invention, none of $R^1$, $R^5$, $R^6$ and $R^{10}$ is selected from $CH_3$, $CF_3$, F, $SMe_2$, biphenyl and phenoxy.

In some embodiments of the present invention, two or more adjacent R groups selected from $R^1$-$R^5$ may be linked to form a substituted or unsubstituted, saturated or unsaturated ring structure.

In some embodiments of the present invention, two or more adjacent R groups selected from $R^6$-$R^{10}$ may be linked to form a substituted or unsubstituted, saturated or unsaturated ring structure.

In some embodiments of the present invention, two or more adjacent R groups selected from $R^{11}$-$R^{14}$ may be linked to form a substituted or unsubstituted, saturated or unsaturated ring structure.

In some embodiments of the present invention, at least one of $R^1$, $R^5$, $R^6$ and $R^{10}$ may be selected from a phenyl and a derivative thereof. In some aspects of these embodiments, at least one of $R^1$, $R^5$, $R^6$ and $R^{10}$ is an ortho substituted phenyl. In some aspects of these embodiments, the ortho substituted phenyl is 2,6-$R^{16}R^{17}$-phenyl, wherein $R^{16}$ and $R^{17}$ are independently selected from hydrogen, halogen, $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof. In some aspects of these embodiments, the derivatives of the foregoing groups may include such groups optionally substituted with hydrocarbyl and/or heteroatom substituents selected from linear or branched $C_1$-$C_5$ alkyl, linear or branched $C_1$-$C_5$ haloalkyl, linear or branched $C_2$-$C_5$ alkenyl and haloalkenyl, halogen, sulfur, oxygen, nitrogen, phosphorus and phenyl, optionally substituted with linear or branched $C_1$-$C_5$ alkyl, linear or branched $C_1$-$C_5$ haloalkyl and halogen. In some aspects of these embodiments, the cycloalkyl and cycloalkenyl groups may be monocyclic or multicyclic. In some aspects of these embodiments, the aryl groups may comprise a single ring (e.g., phenyl) or a fused ring system (e.g., naphthyl, anthracenyl). In some aspects of these embodiments, the cycloalkyl, cycloalkenyl and aryl groups may be taken together to form a fused ring system. In some aspects of these embodiments, each of the monocyclic and multicyclic ring systems may optionally be monosubstituted or multisubstituted with a substituent independently selected from hydrogen, linear and branched $C_1$-$C_5$ alkyl, linear and branched $C_1$-$C_5$ haloalkyl, linear and branched $C_1$-$C_5$ alkoxy, chlorine, fluorine, iodine, bromine, $C_5$-$C_{10}$ cycloalkyl, $C_6$-$C_{15}$ cycloalkenyl and $C_6$-$C_{30}$ aryl.

In some embodiments of the present invention, at least one of $R^1$, $R^5$, $R^6$ and $R^{10}$ is 2,6-dimethoxy phenyl.

In some embodiments of the present invention, the ligand having the structure

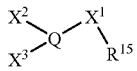

is selected from Structures I-XV presented in Table 1. In some aspects of these embodiments, the ligand is selected from Structures I, XI, and XIV. In some aspects of these embodiments, the ligand is selected from Structures I and XIV. In some aspects of these embodiments, the ligand is Structure I. In some aspects of these embodiments, the ligand is Structure XIV.

In some embodiments of the present invention, the catalyst composition is formed by a process comprising: combining a source of metal, M; and a compound according to the following formula $[X^2X^3Q-X^1—R^{15}]_m[L]_n$; wherein each L is independently selected from hydrogen, lithium, sodium, potassium, thallium, calcium and silver; alternatively each L is lithium; and, wherein m and n are selected to balance the charges.

In some embodiments of the present invention, the at least one monomer having the formula

is selected from $C_1$-$C_{10}$ alkyl(meth)acrylates, styrene, and derivatives thereof.

In some embodiments of the present invention, the at least one acyclic aliphatic olefin is a $C_2$-$C_{20}$ acyclic aliphatic olefin. In some aspects of these embodiments, the at least one acyclic aliphatic olefin is ethylene.

In some embodiments of the present invention, the copolymer contains 1 to 99.9 mol % acyclic aliphatic olefin monomer derived units. In some aspects of these embodiments, the copolymer contains 5 to 99.5 mol % acyclic aliphatic olefin monomer derived units. In some aspects of these embodiments, the copolymer contains 10 to 95 mol % acyclic aliphatic olefin monomer derived units. In some aspects of these embodiments, the copolymer contains 1 to 70 mol % acyclic aliphatic olefin monomer derived units. In some aspects of these embodiments, the copolymer contains 2 to 50 mol % acyclic aliphatic olefin monomer derived units. In some aspects of these embodiments, the copolymer contains 20 to 85 mol % acyclic aliphatic olefin monomer derived units.

In some embodiments of the present invention, the copolymer is a random copolymer.

In some embodiments of the present invention, the copolymer is substantially linear. That is, in some embodiments of the present invention, those portions of the copolymer derived from acyclic aliphatic olefin monomer units have a branch content of $\leq 15$ branches/1,000 carbon atoms; alternatively between 0.5 and 15 branches/1,000 carbon atoms; alternatively $\leq 10$ branches/1,000 carbon atoms; alternatively $\leq 5$ branches/1,000 carbon atoms. In some aspects of these embodiments, the branches contain at least two carbon atoms. The branching content of the copolymer is determined by Carbon 13 NMR and the melting point temperature of the copolymer.

In some embodiments of the present invention, the polymerization temperature is 0 to 200° C. In some aspects of these embodiments, the polymerization temperature is 10 to 180° C. In some aspects of these embodiments, the polymerization temperature is 30 to 150° C. In some aspects of these embodiments, the polymerization temperature is 60 to 120° C.

In some embodiments of the present invention, the process for preparing a copolymer comprising contacting at least one acyclic aliphatic olefin monomer, at least one monomer having the formula

and a catalyst composition comprising a metal center, M, with at least one ligand, wherein the at least one ligand has a structure according to the following formula

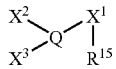

provides copolymers having a number average molecular weight, $M_n$, of $\geq 21,200$; alternatively $M_n \geq 22,000$; alternatively $M_n \geq 24,000$; alternatively $M_n \geq 25,000$; alternatively $M_n \geq 30,000$; alternatively $M_n \geq 40,000$; alternatively $M_n \geq 50,000$; alternatively $M_n \geq 70,000$; alternatively $M_n \geq 95,000$; alternatively $M_n \geq 100,000$; alternatively $M_n \geq 150,000$; alternatively $M_n \geq 200,000$; alternatively $M_n \geq 250,000$; alternatively $M_n \geq 300,000$; alternatively $M_n \geq 350,000$; alternatively $M_n \geq 400,000$; alternatively $M_n \geq 450,000$; alternatively $M_n \geq 500,000$; alternatively $M_n \geq 550,000$; alternatively $M_n \geq 600,000$; alternatively $M_n \geq 650,000$; alternatively $M_n \geq 700,000$; alternatively $M_n \geq 750,000$; alternatively $M_n \geq 800,000$; alternatively $M_n \geq 850,000$; alternatively $M_n \geq 900,000$; alternatively $M_n \geq 950,000$; alternatively $M_n \geq 1,000,000$. In some aspects of these embodiments, the copolymer has a number average molecular weight, $M_n$, of 24,000 to 5,000,000; alternatively $M_n$, of 25,000 to 5,000,000; alternatively $M_n$ of 40,000 to 5,000,000; alternatively $M_n$ of 50,000 to 5,000,000; alternatively $M_n$ of 70,000 to 5,000,000; alternatively $M_n$ of 95,000 to 5,000,000; alternatively $M_n$ of 100,000 to 5,000,000; alternatively $M_n$ of 150,000 to 2,000,000; alternatively $M_n$ of 100,000 to 1,000,000; alternatively $M_n$ of 100,000 to 800,000; alternatively $M_n$ of 250,000 to 500,000.

In some embodiments of the present invention, the copolymer has a polymer chain according to the formula:

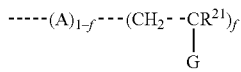

wherein A is derived from an acyclic aliphatic olefin monomer; $R^{21}$ is selected from H and $CH_3$; G is selected from $—OR^{22}$ and $—COOR^{22}$, where $R^{22}$ is a $C_{1-24}$ alkyl group; f is 0.001 to 0.99; and, wherein the copolymer has a number average molecular weight, $M_n$ of $\geq 26,500$. In some aspects of these embodiments, f is 0.005 to 0.95. In some aspects of these embodiments, f is 0.05 to 0.90. In some aspects of these embodiments, f is 0.3 to 0.99. In some aspects of these embodiments, f is 0.5 to 0.98. In some aspects of these embodiments, f is 0.15 to 0.8. In some aspects of these embodiments, the copolymer has a number average molecular weight, $M_n$, of $\geq 30,000$; alternatively $M_n \geq 40,000$; alternatively $M_n \geq 50,000$; alternatively $M_n \geq 70,000$; alternatively $M_n \geq 95,000$; alternatively $M_n \geq 100,000$; alternatively $M_n \geq 150,000$; alternatively $M_n \geq 170,000$; alternatively $M_n \geq 200,000$; alternatively $M_n \geq 250,000$; alternatively $M_n \geq 300,000$; alternatively $M_n \geq 350,000$; alternatively $M_n \geq 400,000$; alternatively $M_n \geq 450,000$; alternatively $M_n \geq 500,000$; alternatively $M_n \geq 550,000$; alternatively $M_n \geq 600,000$; alternatively $M_n \geq 650,000$; alternatively $M_n \geq 700,000$; alternatively $M_n \geq 750,000$; alternatively $M_n \geq 800,000$; alternatively $M_n \geq 850,000$; alternatively $M_n \geq 900,000$; alternatively $M_n \geq 950,000$; alternatively $M_n \geq 1,000,000$. In some aspects of these embodiments, the copolymer has a number average molecular weight, $M_n$, of 26,500 to 5,000,000; alternatively $M_n$ of 40,000 to 5,000,000; alternatively $M_n$ of 50,000 to 5,000,000; alternatively $M_n$ of 70,000 to 5,000,000; alternatively $M_n$ of 95,000 to 5,000,000; alternatively $M_n$ of 100,000 to 5,000,000; alternatively $M_n$ of 150,000 to 2,000,000; alternatively $M_n$ of 100,000 to 1,000,000; alternatively $M_n$ of 100,000 to 800,000; alternatively $M_n$ of 250,000 to 500,000.

In some embodiments of the present invention, the terpolymer has a polymer chain according to the formula

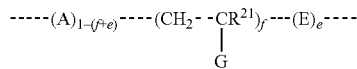

wherein A is a derived from an acyclic aliphatic olefin monomer; $R^{21}$ is selected from H and $CH_3$; G is selected from $-OR^{22}$ and $-COOR^{22}$, where $R^{22}$ is a $C_{1-24}$ alkyl group; E is selected from norbornene, substituted norbornene, styrene and styrene derivatives; wherein f is 0.001 to 0.99 and e is 0.001 to 0.5. In some aspects of these embodiments, f is 0.005 to 0.95, alternatively f is 0.05 to 0.90, alternatively f is 0.3 to 0.99, alternatively f is 0.5 to 0.98, alternatively f is 0.15 to 0.8. In some aspects of these embodiments, e is 0.01 to 0.25, alternatively e is 0.01 to 0.1.

Some embodiments of the present invention will now be described in detail in the following Examples. All fractions and percentages set forth below in the Examples are by weight unless otherwise specified. The chemical structures presented in Table 1 have been drawn according to the general rules for drawing Lewis structures of molecules as described in, for example, Brown, et al., *Organic Chemistry*, Brooks-Cole, 4th ed 2004.

EXAMPLES 1-16

Ligand Synthesis

Following the general procedure presented below using Component A and Component B identified in Table 1 in the amounts listed in Table 1, the Product Solids listed in Table 1 were prepared with the reported yield for examples 1-15, respectively.

Component A was added to a 100 mL flask ("Flask A") then placed under vacuum and refilled with nitrogen and charged with 60 mL of tetrahydrofuran (THF). Flask A was then placed in an ice bath and allowed to cool to 0° C. 10.1 mL of 2.5 molar n-BuLi was then injected. Flask A was then placed in a dry ice/acetone bath and allowed to cool to about −78° C.

A separate 500 mL Schlenk flask ("Flask B") was placed under vacuum. Flask B was purged with nitrogen and charged with ~50 mL of THF. Flask B was then placed in a dry ice/acetone bath and allowed to cool to about −78° C. 1.10 mL of $PCl_3$ was then added to Flask B with agitation. The contents of Flask A were then slowly transferred to Flask B using a cannula with vigorous agitation.

A separate 100 mL flask ("Flask C") was purged and filled with nitrogen. Flask C was then charged with ~60 mL of THF and Component B. Flask C was then placed in a dry ice/acetone bath and allowed to cool with agitation to about −78° C. 10.1 mL of 2.5 molar n-BuLi was added to Flask C and allowed to react for about 15 minutes. The contents of Flask C were then transferred to Flask B, maintained at −78° C., using a cannula with continued vigorous agitation. Following the complete addition of the contents of Flask C into Flask B, Flask B was allowed to warm to room temperature for about 30 minutes. The contents of Flask B were then poured into a 500 mL recovery flask (Flask D) and the THF was removed, leaving a solid. The solid in Flask D was then mixed with distilled water and then transferred to a separation flask (Flask E). 100 mL of $CH_2Cl_2$ was added to the contents of Flask E. Flask E was shaken to mix the two layers. About 5 mL of concentrated HCl was then added to Flask E. Flask E was shaken again. The mixture in Flask E was then allowed to settle, forming two layers—an organic phase on the bottom and a aqueous phase on the top. The organic layer was collected. The aqueous phase was washed with 50 mL of $CH_2Cl_2$. The organic wash material was collected and added to the previously collected organic layer material. The combined organic material was then contacted with $MgSO_4$ and rotovaped to dryness, leaving a solid. The solid was then washed first with diethyl ether and then with THF to remove impurities. The washed Product Solid was collected by filtration with the yield reported in Table 1.

TABLE 1

| | | | Product Solid/Yield | |
|---|---|---|---|---|
| Ex# | Component A | Component B | Chemical Name | Structure |
| 1 | benzene sulfonic acid (2.10 g) | 2',6'dimethoxy-2-biphenylbromide (7.45 g) | 2-(bis (2',6'dimethoxy-2-biphenyl) phosphino) benzene sulfonic acid (~5 g) | 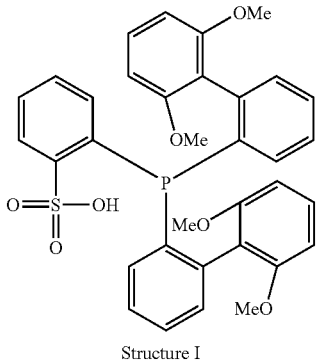<br>Structure I |

TABLE 1-continued

|  |  |  | Product Solid/Yield | |
| --- | --- | --- | --- | --- |
| Ex# | Component A | Component B | Chemical Name | Structure |
| 2 | benzene sulfonic acid (2.10 g) | 2-bromoethylbenzene (4.7 g) | 2-(bis (2-ethylphenyl) phosphino) benzene sulfonic acid (~2 g) | Structure II |
| 3 | benzene sulfonic acid (2.10 g) | 4-bromo-N,N-dimethylaniline (5.1 g) | 2-(bis(4-dimethylaminophenyl) phosphino benzene sulfonic acid (~2 g) | Structure III |
| 4 | napthalenesulfonic acid (2.63 g) | 2-bromoanisole (4.75 g) | 2-(bis (2-methoxyphenyl) phosphino) napthalene sulfonic acid (~1.5 g) | Structure IV |
| 5 | benzene sulfonic acid (2.10 g) | 2-bromo-naphthalene (5.25 g) | 2-(bis (2-naphthalenyl) phosphino) benzene sulfonic acid (~2 g) | Structure V |

TABLE 1-continued

| | | | Product Solid/Yield | |
|---|---|---|---|---|
| Ex# | Component A | Component B | Chemical Name | Structure |
| 6 | benzene sulfonic acid (2.10 g) | Ferrocene (4.7 g) | 2-(bis(ferrocenyl)phosphino) benzene sulfonic acid (~2 g) | 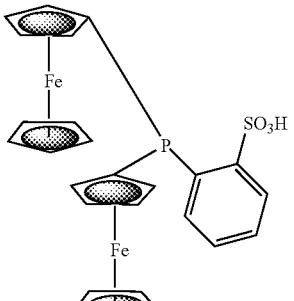<br>Structure VI |
| 7 | benzene sulfonic acid (2.10 g) | Bromo-2,4,6-trimethoxybenzene (6.25 g) | 2-(bis(2,4,6-trimethoxybenzene phenyl) phosphino) benzene sulfonic acid (~2 g) | 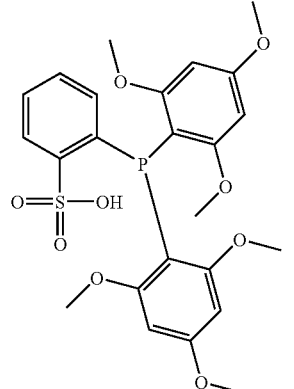<br>Structure VII |
| 8 | benzene sulfonic acid (2.10 g) | Bromo-2,4-dimethoxybenzene (5.5 g) | 2-(bis(2,4-dimethoxy phenyl) phosphino) benzene sulfonic acid (~2 g) | 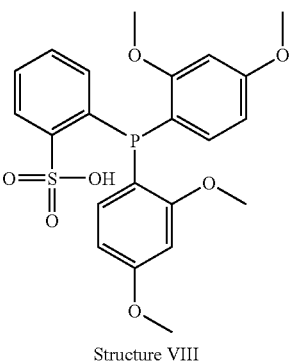<br>Structure VIII |
| 9 | benzene sulfonic acid (2.10 g) | Mesitylbromide (5.04 g) | 2-(bis(mesityl) phosphino) benzene sulfonic acid (~2 g) | 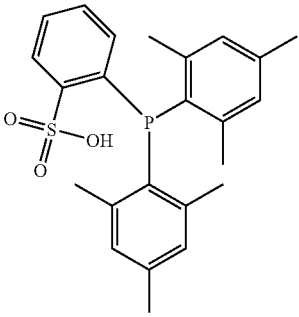<br>Structure IX |

TABLE 1-continued

| Ex# | Component A | Component B | Product Solid/Yield | |
|---|---|---|---|---|
| | | | Chemical Name | Structure |
| 10 | napthalenesulfonic acid (2.63 g) | Mesitylbromide (5.04 g) | 2-(bis(mesityl) phosphino) napthalene sulfonic acid (~2.5 g) | Structure X |
| 11 | benzene sulfonic acid (2.10 g) | 2-bromobiphenyl (5.9 g) | 2-(bis (2-biphenyl) phosphino) benzene sulfonic acid (~2 g) | Structure XI |
| 12 | benzene sulfonic acid (2.10 g) | 3,5-di-t-butyl-bromobenzene (6.81 g) | 2-(bis (3,5-di-t-butyl-phenyl) phosphino) benzene sulfonic acid (~2 g) | Structure XII |
| 13 | benzoic acid (2.10 g) | 2',6'dimethoxy-2-biphenylbromide (7.45 g) | 2-(bis (2',6'dimethoxy-2-biphenyl) phosphino) benzoic acid (~5 g) | Structure XIII |

TABLE 1-continued

| Ex# | Component A | Component B | Chemical Name | Product Solid/Yield Structure |
|---|---|---|---|---|
| 14 | 4-nitrobenzene sulfonic acid (2.10 g) | 2-bromoanisole (4.75 g) | 2-(Bis(2-methoxy-phenyl)-phosphanyl)-4-nitro-benzenesulfonic acid (~2 g) | 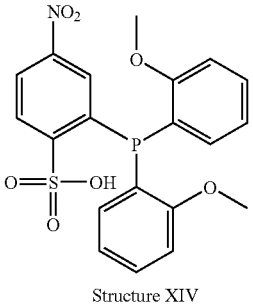<br>Structure XIV |
| 15 | benzene sulfonic acid (2.10 g) | Bromocyclohexane (4.13 g) | 2-Dicyclohexyl phosphanyl-benzenesulfonic acid (~2 g) | 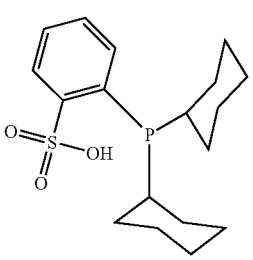<br>Structure XV |

EXAMPLE 16

Synthesis of a Potassium Salt of the Ligand of Structure VI

A 0.45 g (0.81 mmol) sample of Product Solid (i.e., ligand Structure VI) prepared according to Example 6 was added to 50 mL of THF in a reaction flask with vigorous agitation to form a ligand solution. In a separate container, 0.10 g (0.88 mmol) of potassium tert-butoxide was dissolved in 20 mL of THF. The resulting potassium tert-butoxide solution was then added dropwise to the contents of the reaction flask with agitation. Following the addition of the potassium tert-butoxide solution, the contents of the reaction flask were reduced by vacuum extraction of some of the THF solvent leaving approximately 25 mL of product solution in the reaction flask. A potassium salt of the ligand was then precipitated from the remaining product solution through the addition of 20 mL of pentane. The precipitated potassium salt of the ligand was recovered by filtration through a fine porosity frit and washed with pentane 3×20 mL. The potassium salt of the ligand was then subjected to vacuum to remove the remaining volatiles, leaving a dark orange Product Powder 0.40 g (0.67 mmol, 83%).

EXAMPLE 17

Synthesis of a Silver Salt of the Ligand of Structure VII

A 0.75 g (1.43 mmol) sample of the Product Solid (i.e., ligand Structure VII) prepared according to Example 7 was added to 50 mL of methanol in a reaction flask with vigorous agitation. In a separate container, 0.23 g (1.36 mmol) of silver nitrate was dissolved in 50 mL of deionized water. The resulting silver nitrate solution was then added dropwise to the contents of the reaction flask with vigorous agitation. Agitation of the contents of the reaction flask was continued for 20 minutes following addition of the silver nitrate solution. The contents of the reaction flask were then reduced by vacuum extraction of some of the solvent leaving approximately 50 mL and resulting in the formation of a gray precipitate. The precipitate was recovered by filtration through a fine porosity frit and washed with water 2×20 mL. The silver salt of the ligand was then dried under reduced pressure, leaving a dark gray Product Powder (0.35 g, 0.62 mmol, 44%).

EXAMPLES 18-31

Preparation Transition Metal Catalyst Complexes

A sample of Component A identified in Table 2 was added to 30 mL of tetrahydrofuran in a reaction flask with agitation. To the contents of the reaction flask was then added Component B identified in Table 2, with continued agitation. The contents of the reaction flask were then agitated for 30 minutes before adding Component C identified in Table 2. The contents of the reaction flask were then reduced under vacuum and pentane was added to precipitate the product catalyst complex. The product catalyst complex was collected by filtration through a fine porosity frit and washed with pentane 2×20 mL. The product catalyst complex was then subjected to vacuum to remove the remaining volatiles, leaving the Product Yield reported in Table 2.

TABLE 2

| Ex. # | Component A | Component B | Component C | Product Yield |
|---|---|---|---|---|
| 18 | Product Solid prepared according to Example 1 (0.943 g) | dimethyl tetramethylethylene diamine palladium (II) (0.388 g) | Pyridine (~0.2 ml) | 940 mg |
| 19 | Product Solid prepared according to Example 2 (340 mg) | dimethyl tetramethylethylene diamine palladium (II) (200 mg) | Pyridine (~0.2 ml) | 440 mg |
| 20 | Product Solid prepared according to Example 3 (79 mg) | dimethyl tetramethylethylene diamine palladium (II) (50 mg) | Pyridine (~0.2 ml) | 87 mg |
| 21 | Product Solid prepared according to Example 4 (45 mg) | dimethyl tetramethylethylene diamine palladium (II) (25 mg) | Pyridine (~0.2 ml) | 33 mg |
| 22 | Product Solid prepared according to Example 5 (44 mg) | dimethyl tetramethylethylene diamine palladium (II) (25 mg) | Pyridine (~0.2 ml) | 41 mg |
| 23 | Product Solid prepared according to Example 8 (0.370 g) | dimethyl tetramethylethylene diamine palladium (II) (0.200 g) | Pyridine (~0.2 ml) | 440 |
| 24 | Product Solid prepared according to Example 9 (0.640 g) | dimethyl tetramethylethylene diamine palladium (II) (0.350 g) | Pyridine (~0.2 ml) | 700 |
| 25 | Product Solid prepared according to Example 11 (0.396 g) | dimethyl tetramethylethylene diamine palladium (II) (0.200 g) | Pyridine (~0.2 ml) | 540 mg |
| 26 | Product Solid prepared according to Example 12 (0.2272 g) | dimethyl tetramethylethylene diamine palladium (II) (0.100 g) | Pyridine (~0.2 ml) | 320 mg |
| 27 | Product Solid prepared according to Example 13 (210 mg) | dimethyl tetramethylethylene diamine palladium (II) (150 mg) | Pyridine (~0.2 ml) | 200 mg |
| 28 | Product Solid prepared according to Example 14 (115 mg) | dimethyl tetramethylethylene diamine palladium (II) (50 mg) | Pyridine (~0.2 ml) | 78 mg |
| 29 | Product Solid prepared according to Example 15 (83 mg) | dimethyl tetramethylethylene diamine palladium (II) (50 mg) | Pyridine (~0.2 ml) | 5 mg |
| 30 | Product Powder prepared according to Example 16 (0.135 g) | (1,5 cyclooctadiene) methyl palladium (II) triflate (0.086 g) | none | 148 mg |
| 31 | Product Powder prepared according to Example 17 (0.098 g) | chloro(1,5 cyclooctadiene) methyl palladium (II) (0.046 g) | none | 780 mg |

EXAMPLE 32

Preparation of Transition Metal Catalyst Complex & Heck Coupling

A reaction flask was charged with 0.02 g (30 µmol) of palladium acetate and 0.025 g (70 µmol) of a Product Solid (i.e., ligand Structure XIII) prepared according to Example 13. The contents were dissolved in 1.5 mL of benzene. Bromobenzene (50 µL, 0.21 mmol) and methylacrylate (50 µL, 0.58 mmol) were added to the reaction flask followed by the addition of excess sodium acetate. The reaction was heated for 24 hours. Based on limiting reagent, conversion to 3-Phenyl-acrylic acid methyl ester was determined to be 30%.

EXAMPLE 33

Catalyst Preparation/Polymerization

An 8 mL serum vial equipped with a stirring bar in a glovebox was charged with palladium bis(dibenzylideneacetone) (41.1 mg, 72.0 µmol); product solid (i.e., ligand Structure IX) prepared according to Example 9 (45.0 mg, 86.4 µmol) and toluene (4.5 mL). The contents of the serum vial were allowed to stir for 10 minutes, producing a red/brown mixture (i.e., catalyst complex).

A reactor cell in a glovebox was charged with methyl acrylate (1.0 mL, 11.1 mmol), followed by the addition of toluene (4.0 mL). The reactor was then heated to 100° C. with agitation. The reactor cell was then pressurized with ethylene gas to 400 psig. After equilibration, a sample of catalyst complex as described above (0.5 mL, 8 µmol Pd) was injected into the reactor cell, followed by a 0.5 mL toluene rinse. After 60 minutes, the reactor cell was vented and allowed to cool. The reactor cell was then removed from the glovebox. The reactor cell was observed to contain a green colored liquid with a black precipitate. The black precipitate dissolved when added to acidified MeOH (10% HCl). No polymer was observed to form.

EXAMPLE 34

Catalyst Preparation/Polymerization

A sample of Product Solid (i.e., ligand Structure IX) prepared according to Example 9 (0.640 g, 1.40 mmol) was added to 30 mL of THF in a reaction flask with agitation. Dimethyl tetramethylethylenediamine palladium (II) (0.350 g, 1.40 mmol) was then added to the reaction flask with agitation. The contents of the reaction flask were agitated for 30 minutes before adding dry pyridine (0. 185 mL, 2.1 mmol). The contents of the reaction flask were then reduced under vacuum and pentane was added to precipitate the catalyst complex. The catalyst complex was collected by filtration through a fine porosity frit and washed with pentane 2×20 mL. The catalyst complex was then subjected to vacuum to remove the remaining volatiles, leaving a white solid (0.68 g, 1.09 mmol, 78%).

Methyl acrylate (1.0 mL, 11.1 mmol), followed by toluene (4.0 mL), were charged to a reactor cell in a glovebox. The contents of the cell were then heated to 80° C. and pressurized with ethylene gas to 400 psig. After equilibration, a sample of the catalyst complex prepared above (3 mg, 4.8 µmol) was dissolved in 0.5 mL toluene and was injected into the reactor cell, followed by a 0.5 mL toluene rinse. After 60 minutes, the reactor cell was vented and allowed to cool. The contents of the reactor cell were then removed from the glovebox and were added to rapidly stirred MeOH. After 60 minutes, the resulting mixture was filtered on a glass frit, washed with excess MeOH and dried overnight at 60° C. under vacuum. The subject reaction yielded 0.10 g of a random copolymer of ethylene and methyl acrylate.

EXAMPLE 35-42

Polymerization

A reactor cell in a glovebox was charged with the Monomer Component identified in Table 3, followed by THF (4.0 mL). The contents of the reactor cell were then heated to 80° C. and pressurized with ethylene gas to 400 psig. After equilibration, 0.5 mL of tetrahydrofuran containing the Catalyst Component identified in Table 3 was injected into the reactor cell, followed by a tetrahydrofuran rinse (0.5 mL). After 60 minutes, the reactor cell was vented and allowed to cool. The contents of the reactor cell were then removed from the glovebox and added to rapidly stirred MeOH. After stirring for 60 minutes, the polymer was vacuum filtered and dried under vacuum at 60° C. for 18 hours. The Product Yield of random copolymer from this reaction was as reported in Table 3.

TABLE 3

| Ex. # | Monomer Component | Catalyst Component | Random Copolymer Product Yield |
|---|---|---|---|
| 35 | butyl acrylate (1.0 mL, 6.98 mmol) | Product of Ex # 19 (4.2 μmol Pd) | 0.28 g |
| 36 | butyl acrylate (1.0 mL, 6.98 mmol) | Product of Ex # 26 (0.5 mL, 8.0 μmol Pd) | 0.1 g |
| 37 | butyl acrylate (1.0 mL, 6.98 mmol) | Product of Ex # 30 (0.5 mL, 8.0 μmol Pd) | 0.1 g |
| 38 | styrene (1.0 mL, 8.73 mmol) | Product of Ex # 26 (0.5 mL, 8.0 μmol Pd) | 0.21 g |
| 39 | styrene (1.0 mL, 8.73 mmol) | Product of Ex # 30 (0.5 mL, 8.0 μmol Pd) | 0.10 g |
| 40 | styrene (1.0 mL, 8.73 mmol) | Product of Ex # 25 (0.5 mL, 8.0 μmol Pd) | 0.58 g |
| 41 | isobornyl acrylate (1.0 mL, 4.73 mmol) | Product of Ex # 19 (0.5 mL, 4.2 μmol Pd) | 0.44 g |
| 42 | isobornyl acrylate (1.0 mL, 4.73 mmol) | Product of Ex # 26 (0.5 mL, 8.0 μmol Pd) | 0.15 g |

EXAMPLE 43

Polymerization

To an 8 mL serum vial equipped with a stirring bar in a glovebox was added Palladium bis(dibenzylideneacetone) (41.1 mg, 72.0 μmol); a sample of the Product Solid (i.e., ligand Structure XII) prepared according to Example 12 (45.0 mg, 86.4 μmol) and toluene (4.5 mL). The contents of the serum vial were allowed to stir for 10 minutes, producing a red/brown mixture (i.e., catalyst complex).

Three separate reactor cells in a glovebox were each charged with butyl acrylate (1.0 mL, 11.1 mmol), followed by toluene (4.0 mL). The contents of the separate reactor cells were then pressurized with ethylene gas to 400 psig and heated to the temperature noted in Table 4. After equilibration, a 0.5 mL sample of the catalyst complex prepared above (8.0 μmol Pd) was injected into each reactor cell, followed by a toluene rinse (0.5 mL). After 60 minutes, the reactor cells were vented and allowed to cool. The contents of the reactor cells were then removed from the glovebox and separately added to rapidly stirred MeOH. After stirring for 60 minutes, the product polymer in each reactor cell was separately vacuum filtered and dried under vacuum at 60° C. for 18 hours. The polymer yield, butyl acrylate incorporation, weight average molecular weight, $M_w$, number average molecular weight, $M_n$, and PDI (i.e., $M_w/M_n$) for each reactor cell are reported in Table 4.

TABLE 4

| Reactor Cell # | Reaction Temp | Polymer Yield | Butyl acrylate incorporation | Mw (g/mol) | Mn (g/mol) | PDI |
|---|---|---|---|---|---|---|
| 1 | 90° C. | 0.65 g | 1.1 mol % | 108,000 | 72,000 | 1.5 |
| 2 | 110° C. | 0.48 g | 1.2 mol % | 68,000 | 40,000 | 1.7 |
| 3 | 120° C. | 0.30 g | 1.7 mol % | 43,000 | 25,000 | 1.7 |

EXAMPLE 44

Polymerization

Styrene (1.0 mL, 8.73 mmol) and norbornene (1.0 mL, 7.98 mmol, 85 mol % norbornene in toluene) were charged to a reactor cell in a glovebox. Toluene (4.0 mL) was then charged to the reactor cell. The contents of the reactor cell were then heated to 80° C. and pressurized with ethylene gas to 400 psig. After equilibration, a sample of a catalyst complex prepared according to Example 18 (1.6 mg, 2 μmol) was dissolved in 0.5 mL toluene and was injected into the reactor cell, followed by a 0.5 mL toluene rinse. After 60 minutes, the reactor cell was vented and allowed to cool. The contents of the reactor cell were then removed from the glovebox and were added to rapidly stirred MeOH. After 60 minutes, the resulting mixture was filtered on a glass frit, washed with excess MeOH and dried overnight at 60° C. under vacuum. The subject reaction yielded 0.20 g of a random copolymer of ethylene, styrene and norbornene.

EXAMPLE 45

Polymerization

Methyl acrylate (1.0 mL, 11.1 mmol) and norbornene (1.0 mL, 7.98 mmol, 85 mol % norbornene in toluene) were charged to a reactor cell in a glovebox. Toluene (4.0 mL) was then charged to the reactor cell. The contents of the reactor cell were then heated to 80° C. and pressurized with ethylene gas to 400 psig. After equilibration, a sample of a catalyst complex prepared according to Example 18 (1.6 mg, 2 μmol) was dissolved in 0.5 mL toluene and was injected into the reactor cell, followed by a 0.5 mL toluene rinse. After 60 minutes, the reactor cell was vented and allowed to cool. The contents of the reactor cell were then removed from the glovebox and were added to rapidly stirred MeOH. After 60 minutes, the resulting mixture was filtered on a glass frit, washed with excess MeOH and dried overnight at 60° C. under vacuum. The subject reaction yielded 0.59 g of a random copolymer of ethylene, methyl acrylate and norbornene.

EXAMPLE 46

Polymerization

Methyl acrylate (1.0 mL, 11.1 mmol) and styrene (1.0 mL, 8.73 mmol) were charged to a reactor cell in a glovebox. Toluene (4.0 mL) was then charged to the reactor cell. The contents of the reactor cell were then heated to 80° C. and pressurized with ethylene gas to 400 psig. After equilibration, a sample of a catalyst complex prepared according to Example 18 (1.6 mg, 2 μmol) was dissolved in 0.5 mL toluene and was injected into the reactor cell, followed by a 0.5 mL toluene rinse. After 60 minutes, the reactor cell was vented and allowed to cool. The contents of the reactor cell were then removed from the glovebox and were added to rapidly stirred MeOH. After 60 minutes, the resulting mixture was filtered on a glass frit, washed with excess MeOH and dried overnight at 60° C. under vacuum. The subject reaction yielded 0.81 g of a random copolymer of ethylene, methyl acrylate and styrene.

EXAMPLE 47

Polymerization

To a 5 mL serum vial was added 41.4 mg (72 µmol) Palladium bis(dibenzylideneacetone) and 53.1 mg (86.4 µmol) of a Product Solid (i.e., ligand Structure I) prepared according to Example 1. To this vial was then added 4.5 ml THF. The contents of the serum vial were stirred for several minutes to prepare a catalyst complex.

Methyl acrylate (1.0 mL, 11.1 mmol) and THF (4.0 mL), were charged to a reactor cell in a glovebox. The contents of the reactor cell were then heated to 70° C. and pressurized with ethylene gas to 400 psig. After equilibration, 0.1 mL (1.6 µmol) of the catalyst complex from the serum vial was injected into the reactor cell, followed by a 0.5 mL THF rinse. After 60 minutes, the reactor cell was vented and allowed to cool. The contents of the reactor cell were then removed from the glovebox and were added to rapidly stirred MeOH. After 60 minutes, the resulting mixture was filtered on a glass frit, washed with excess MeOH and dried overnight at 60° C. under vacuum. The subject reaction yielded 1.02 g of a random copolymer of ethylene and methyl acrylate with an acrylate incorporation of 4.8 mol %; a weight average molecular weight, $M_w$, of 474,000 and a number average molecular weight, $M_n$, of 178,000.

EXAMPLE 48

Polymerization

To a 5 mL serum vial was added 41.4 mg (72 µmol) Palladium bis(dibenzylideneacetone) and 53.1 mg (86.4 µmol) of a Product Solid (i.e., ligand Structure I) prepared according to Example 1. To this vial was then added 4.5 ml THF. The contents of the serum vial were stirred for several minutes to prepare a catalyst complex.

Methyl acrylate (1.0 mL, 11.1 mmol) and THF (4.0 mL), were charged to a reactor cell in a glovebox. The contents of the reactor cell were then heated to 70° C. and pressurized with ethylene gas to 400 psig. After equilibration, 0.1 mL (8.0 µmol) of the catalyst complex from the serum vial was injected into the reactor cell, followed by a 0.5 mL THF rinse. After 60 minutes, the reactor cell was vented and allowed to cool. The contents of the reactor cell were then removed from the glovebox and were added to rapidly stirred MeOH. After 60 minutes, the resulting mixture was filtered on a glass frit, washed with excess MeOH and dried overnight at 60° C. under vacuum. The subject reaction yielded 1.28 g of a random copolymer of ethylene and methyl acrylate with an acrylate incorporation of 2.7 mol % and a weight average molecular weight, $M_w$, of 172,000 and a number average molecular weight, $M_n$, of 57,000.

EXAMPLE 49

Polymerization

To a 5 mL serum vial was added 41.4 mg (72 µmol) Palladium bis(dibenzylideneacetone) and 53.1 mg (86.4 µmol) of a Product Solid (i.e., ligand Structure I) prepared according to Example 1. To this vial was added 4.5 ml toluene. The contents of the serum vial were stirred for several minutes to prepare a catalyst complex.

Methyl acrylate (1.0 mL, 11.1 mmol) and toluene (4.0 mL), were charged to a reactor cell in a glovebox. The contents of the reactor cell were then heated to 50° C. and pressurized with ethylene gas to 400 psig. After equilibration, 0.5 mL (8.0 µmol) of the catalyst complex from the serum vial was injected into the reactor cell, followed by a 0.5 mL toluene rinse. After 60 minutes, the reactor cell was vented and allowed to cool. The contents of the reactor cell were then removed from the glovebox and were added to rapidly stirred MeOH. After 60 minutes, the resulting mixture was filtered on a glass frit, washed with excess MeOH and dried overnight at 60° C. under vacuum. The subject reaction yielded 0.81 g of a random copolymer of ethylene and methyl acrylate with an acrylate incorporation of 0.4 mol %; a weight average molecular weight, $M_w$, of 716,000 and a number average molecular weight, $M_n$, of 388,000.

EXAMPLE 50

Ligand Synthesis

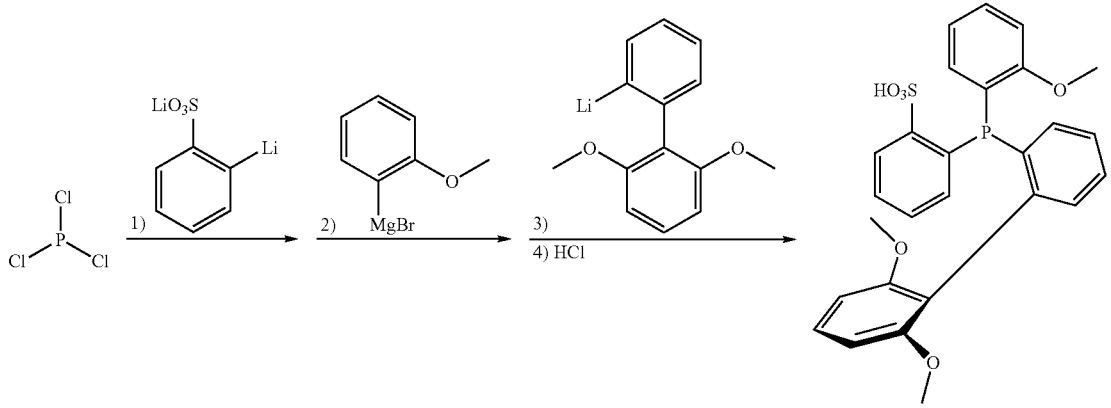

A first 100 mL Schlenk flask was charged with benzenesulfonic acid hydrate (1.7 g, 10.7 mmol, $C_6H_6O_3S \cdot H_2O$, 158.71 g/mol, MP Bio Medicals 98-11-3). The flask was evacuated under vacuum. The bottom of the flask was then heated using a heat gun. The flask contents melted to form a brown liquid, which started bubbling. The heating was continued until the liquid started to reflux and the pressure dropped to approximately 10 mTorr. The flask was filled with nitrogen, cooled and THF (anhydrous, Acros, ~50 mL) was added to the flask forming a clear colorless solution. At 0° C., n-BuLi (2.5 M hexane solution, 11.4 mmol, 8.6 mL, Aldrich) was added to yield a beige suspension, which was stirred for 0.5 hr before being cooled at −78° C.

A second 100 mL Schlenk flask was charged with Mg (0.30 g, 0.0125 mmol, powder, Aldrich). THF (50 mL, anhydrous, Acros) and 2-bromoanisole (2.10 g, 0.0112 mmol, $C_7H_7BrO$, 187.04 g/mol, Acros) were added to the second Schlenk flask. The contents of the second Schlenk flask were sonicated (~30 sec.) and the contents were observed to exhibit a temperature rise. The mixture was stirred until it cooled back down to room temperature.

A 200 mL Schlenk flask was charged with THF (~50 mL). At −78° C., $PCl_3$ (0.93 mL, 1.47 g, 0.0107 mol, 1.574 g/mL, 137.33 g/mol, Aldrich) was added to the 200 mL Schlenk flask via syringe. The beige suspension in the first 100 mL Schlenk flask was transferred to the 200 mL Schlenk flask at −78° C. via cannula. The contents of the 200 mL Schlenk flask were then stirred for 0.5 hours while maintaining the temperature at −78° C. The contents of the second 100 mL Schlenk flask was cooled to −78° C. and transferred to the 200 mL Schlenk flask via cannula. The contents of the 200 mL Schlenk flask were then warmed to ambient temperature and stirred for about an hour to yield a yellow solution.

A 500 mL Schlenk flask was charged with 2'-Br-2,6-$(Me)_2$ biphenyl (3.14 g, 10.7 mmol, $C_{14}H_{13}BrO_2$, 293.16 g/mol, Aldrich) ant THF (150 mL). The contents of the 500 mL Schlenk flask were cooled to −78° C. n-BuLi (4.3 mL, 2.5 M hexane solution, 10.7 mmol, Aldrich) at −78° C. was added to the 500 mL Schlenk flask, yielding a thick, white slurry. The 500 mL Schlenk flask was shaken by hand to ensure mixing. A 0.5 hour after the addition of the n-BuLi, the contents of the 200 mL Schlenk flask were added to the 500 mL Schlenk flask via cannula. The contents of the 500 mL Schlenk flask were then allowed to gradually warm to ambient temperature. The contents of the 500 mL Schlenk flask were stirred overnight to yield a clear yellow solution. The volatiles were removed from the 500 mL Schlenk flask under vacuum. The resulting solid was extracted using $CH_2Cl_2$ (200 mL), $H_2O$ (200 mL), HCl (concentrated, 20 mL). The organic layer from the extract was dried with $MgSO_4$ and the volatile portion of the extract was removed under vacuum to leave a pale yellow solid. The pale yellow solid was collected and washed with THF (3×15 mL) and $Et_2O$ (3×15 mL) to yield a white powder product ligand (2.3 g, 44% yield). $^1$H NMR ($CDCl_3$, ° C.): δ8.32 (m, 1H), 7.71 (q, J=8.5, 2H), 7.56 (m, 1H), 7.47-7.40 (m, 4H), 7.33-7.27 (m, 2H), 6.99 (m, 2H), 6.91 (m, 1H), 6.57 (d, J=8.5, 1H), 6.44 (d, J=8.5, 1H), 3.73 (s, 3H), 3.64 (s, 3H), 3.19 (s, 3H). $^{31}$P NMR ($CDCl_3$, ° C.): δ-7.1 (s). LC-MS: m/z=509.2.

EXAMPLE 51

Polymerization

The vial was charged with $Pd(dba)_2$ (19.8 mg, 0.0340 mmol, $Pd(C_{17}H_{14}O)_2$, Alfa Aesar, 575.00 g/mol) and the product ligand of Example 50 (20.0 mg, 0.0390 mmol, $C_{27}H_{25}O_6PS$, 508.53 g/mol). Toluene (10 mL) was then added to the vial. The contents of the vial were vigorously shaken to yield a dark red catalyst solution with a trace amount of particles.

A reactor cell was charged with methyl acrylate (1 mL) and toluene (4 mL). The reactor cell was heated to 90° C. Ethylene was then charged to the reactor cell (400 psi). The catalyst solution (0.5 mL) from the vial was added to the reactor cell vial cannula followed by a toluene rinse (0.5 mL). The reactor cell contents were stirred at 90° C. for 1 hour. The unreacted ethylene was vented from the reactor cell and the contents of the reactor cell were cooled to ambient temperature. The contents of the reactor cell were then quenched with methanol (100 mL). The precipitated polymer in the reactor cell was separated by centrifuge and dried under vacuum at 60° C. overnight to yield a white solid (720 mg). $^1$H NMR spectroscopy revealed that the white solid had a composition of ethylene (97 mole %) and methyl acrylate (3 mole %). GPC analysis revealed that the white solid had a weight average molecular weight of 115,000 g·mol$^{-1}$ with a polydispersity of 1.5.

We claim:

1. A process for preparing a copolymer comprising contacting at least one acyclic aliphatic olefin monomer, at least one monomer having the formula

and a catalyst composition comprising a metal center, M, complexed with at least one ligand, wherein the at least one ligand has a structure according to the following formula

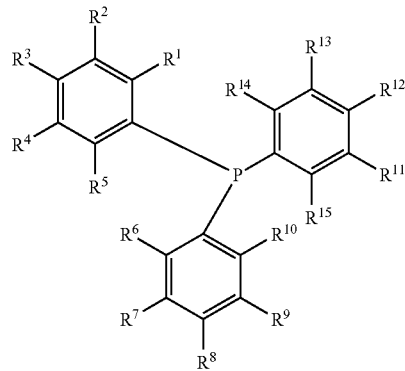

wherein Z is selected from a halogen, —CN, an aromatic hydrocarbyl group, —COY and —$CO_2Y$; where Y is selected from hydrogen and $R^{19}$; where $R^{19}$ is selected from a hydrocarbyl group, an aromatic hydrocarbyl group and derivatives thereof;

wherein J is selected from a hydrogen and an aliphatic hydrocarbyl group having up to 30 carbons;

wherein the metal center is selected from Ni and Pd;

wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl and silyl;

wherein at least one of $R^1$, $R^5$, $R^6$ and $R^{10}$ is a 2,6-$R^{16}R^{17}$-phenyl, where $R^{16}$ and $R^{17}$ are independently selected from hydrogen, halogen, $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl and silyl;

wherein $R^{15}$ is —$SO_3$;

wherein the copolymer has a number average molecular weight of $\geqq 21,200$ and wherein the copolymer comprises 1 to 99.9 mol % acyclic aliphatic olefin monomer units.

2. The process of claim 1, wherein the at least one monomer having the formula

is selected from $C_1$-$C_{10}$ alkyl(meth)acrylates, styrene, and derivatives thereof.

3. The process of claim 1, wherein the branch content of those portions of the copolymer derived from acyclic aliphatic olefin monomer units exhibit a branch content of $\leqq 15$ branches/1,000 carbon atoms, wherein the branching content is determined by Carbon 13 NMR and the melting point of the copolymer.

4. The process of claim 1, wherein M is Pd.

5. The process of claim 1, wherein the at least one acyclic aliphatic olefin monomer is ethylene.

6. The process of claim 1, wherein the polymerization temperature is 0 to 200° C.

7. The process of claim 2, wherein at least one of $R^1$, $R^5$, $R^6$ and $R^{10}$ is 2,6-dimethoxy phenyl.

8. The process of claim 7, wherein the copolymer has a number average molecular weight of $\geqq 50,000$.

* * * * *

UNITED STATES PATENT AND TRADEMARK OFFICE
CERTIFICATE OF CORRECTION

PATENT NO. : 7,635,739 B2 Page 1 of 1
APPLICATION NO. : 11/457982
DATED : December 22, 2009
INVENTOR(S) : Allen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Ninth Day of November, 2010

David J. Kappos
*Director of the United States Patent and Trademark Office*